United States Patent Office 3,134,754
Patented May 26, 1964

3,134,754
POLYEPOXIDE COMPOSITIONS
Henry Brunner and Michael John Waghorn, Slough, England, assignors to Imperial Chemical Industries Limited, Millbank, London, England, a corporation of Great Britain
No Drawing. Filed Aug. 3, 1959, Ser. No. 831,038
Claims priority, application Great Britain Aug. 5, 1958
5 Claims. (Cl. 260—47)

This invention relates to the curing of polyepoxides using boroxines as curing agents and to the resulting products obtained. The term "polyepoxide" used in this specification means a compound having two or more epoxide

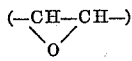

groups arranged in one or more open chains.

Suitable polyepoxides may be derived from dihydric compounds especially dihydric phenols and having the general formula:

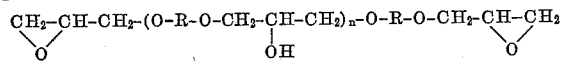

where R is the residue of a dihydric compound and $n$ is 0 or a small integer, for example from 1 to 9. A group of polyepoxides of this class which has found considerable use in recent years in coating compositions is that derived from 2:2-bis(4-hydroxyphenyl) propane as the dihydroxy compound. Such polyepoxides provide valuable surface coatings when they are reacted, for example, by heating, with certain reactive substances generally known as curing agents. These substances appear to function by inducing reaction between hydroxyl or epoxide groups in adjacent chains.

A large number of substances have been tried hitherto as curing agents for polyepoxides, but none of them has proved really satisfactory for a variety of reasons. Some require very high temperatures and lead to badly discoloured products and others, while effective at lower temperatures, have been shown to have dermititic properties, thus rendering them unsuitable for use on a commercial scale.

It has now been found according to this invention that certain boroxines are effective curing agents for polyepoxides at relatively low temperatures providing tough products showing very little, if any, discolouration even after prolonged heating.

Accordingly, the present invention provides a curable composition containing a polyepoxide and, as a curing agent for the polyepoxide, a boroxine of the general formula:

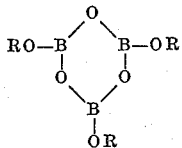

where R is an alkyl or aryl group.

Boroxines suitable for use in this invention include those where R is an alkyl group having from 1 to 6 carbon atoms, inclusive. Very satisfactory results have been obtained, for examples, using trialkoxyboroxines such as tri-n-butoxy boroxine $(C_4H_9O)_4B_3O_3$.

The proportion in which the curing agents of this invention can be used in the curing of polyepoxides naturally depends upon the reactivity of the individual curing agent. The most suitable proportions of curing agent to be used can be ascertained by tests, although the preferred proportion is between 3 and 20% by weight of the polyepoxide.

Where the curing agent is particularly reactive, mixtures of curing agent and polyepoxide cannot be stored for any length of time even at room temperature without reaction taking place between them. In such instances, it is desirable that the polyepoxide and the curing agent be stored separately to avoid premature reaction and mixed together only when required. Where the curing agent is exceptionally reactive, it is sometimes necessary to mix the curing agent and polyepoxide immediately prior to use.

The curable compositions of this invention can, if desired, include one or more substances which act as plasticizers and in fact the use of such substances may be necessary where the polyepoxide used is one or relatively high molecular weight. Substances which can be used as plasticizers include liquid polyepoxides such as epoxidised soya bean oil, mono-epoxides such as phenyl glycidyl ether, and other plasticizers such as dibutyl phthalate, methoxy ethyl phthalate and tricresyl phosphate.

Where coloured products or products of high opacity are required, it is very convenient to incorporate a pigment, for example, titanium dioxide or zinc oxide, in the compositions of this invention.

The present invention also includes a process for curing polyepoxides, in which a mixture of a polyepoxide and a boroxine of the general formula $R_3O.B_3O_3$, where R is an alkyl or aryl group, is subjected to curing conditions, for example, to the action of heat.

The curable compositions of this invention can be used in a variety of applications, for example, coating compositions, moulding compositions and as fillers and solders. For some of these applications the curable compositions can be used without further formulation depending upon the physical properties of the individual compositions. For other uses, however, it is necessary to use suitable ingredients which when blended with the curable composition will provide the desired physical properties for the particular application required. For example, where a composition of this invention is used in a coating composition for spray application it is usually necessary to dilute the composition with a solvent. Solvents which have been used for compositions containing a polyepoxide derived from 2:2-bis(4-hydrophenyl) propane include methyl ethyl ketone and butanol.

The invention is illustrated by the following example.

*Example 1*

This example describes the use of tri-n-butoxy-boroxine as a curing agent for the liquid polyepoxide made by reacting epichlorhydrin with diphenylolpropane in the presence of alkali. This polyepoxide contains about 70% by weight of 2:2-bis(4-hydroxyphenyl) propane diglycidyl ether together with minor amounts of higher epoxides. A coating composition was obtained by mixing together the following ingredients:

| | Parts by weight |
|---|---|
| Liquid polyepoxide | 95 |
| Tri-n-butoxy boroxine | 5 |

The stoving composition was tested by being applied to a test panel which was then stoved at 150° C. It was found that a hard, clear, coating was obtained after only one hour at this temperature.

The tri-n-butoxy boroxine used in the above experiment has been obtained by dissolving boric anhydride in butyl borate and filtering the viscous liquid obtained through sintered glass to remove unreacted anhydride. The tri-n-butoxy boroxine is compatible with the liquid polyepoxide in proportions up to 20% by weight. The higher the proportion, the lower is the temperature required to cure the composition. For example, using 10% curing agent the composition may be cured at 110° C.

Example II

Example I was repeated using the same polyepoxide and with trimethoxy boroxine as curing agent. 2 parts of trimethoxy boroxine were mixed with 95 parts of the liquid polyepoxide.

A film, on a steel panel, prepared from this mixture was stoved for 50 minutes at 150° C. and gave a hard, clear coating.

Example III

A solid polyepoxide resin, obtained by reacting diphenylolpropane with epichlorhydrin, was blended with an equal weight of epoxidised soya bean oil and to the mixture was added 5% by weight of the mixture of tri-n-butoxy boroxine.

A film prepared from the mixture was stoved for 30 minutes at 120° C. to give a clear, hard but flexible, film.

What we claim is:

1. A process for curing a polyepoxide having the formula

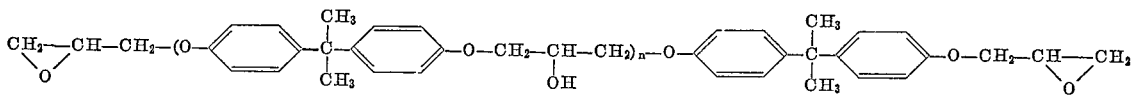

in which $n$ is between 0 and 9, which comprises reacting said polyepoxide with a curing agent of the general formula

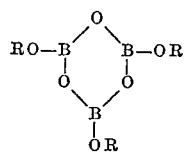

in which R is an alkyl group having from one to six carbon atoms.

2. A process for curing as set forth in claim 1 in which the weight of curing agent is between 3 and 20% by weight of the polyepoxide.

3. A cured polyepoxide compound prepared by the process of claim 1.

4. A cured polyepoxide composition as set forth in claim 3 including a plasticizer.

5. A process for curing a polyglycidyl ether of bis-(4-hydroxyphenyl)-dimethylmethane which comprises reacting said polyglycidyl ether with a curing agent of the general formula

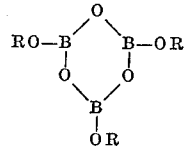

in which R is a lower alkyl radical.

References Cited in the file of this patent

UNITED STATES PATENTS

| | | |
|---|---|---|
| 2,787,329 | Schechter | Apr. 2, 1957 |
| 2,809,184 | Langer | Oct. 8, 1957 |